(12) United States Patent
Ohfeld et al.

(10) Patent No.: US 12,730,932 B1
(45) Date of Patent: Sep. 8, 2026

(54) TECHNIQUES FOR REMEDIATING DELETED DATA CYBERSECURITY RISKS

(71) Applicant: Wiz, Inc., New York, NY (US)

(72) Inventors: Nir Ohfeld, Tel Aviv (IL); Shir Tamari, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/247,792

(22) Filed: Jun. 24, 2025

(51) Int. Cl.

| | |
|---|---|
| ***G06F 21/62*** | (2013.01) |
| ***G06F 3/06*** | (2006.01) |
| ***G06F 8/61*** | (2018.01) |
| ***G06F 9/455*** | (2018.01) |
| ***G06F 21/57*** | (2013.01) |
| ***G06F 21/60*** | (2013.01) |

(52) U.S. Cl.
CPC ........ *G06F 21/6245* (2013.01); *G06F 3/0623* (2013.01); *G06F 3/0652* (2013.01); *G06F 3/0674* (2013.01); *G06F 8/63* (2013.01); *G06F 9/45558* (2013.01); *G06F 21/577* (2013.01); *G06F 21/602* (2013.01); *G06F 2009/45562* (2013.01)

(58) Field of Classification Search
CPC .. G06F 21/602; G06F 21/577; G06F 21/6245; G06F 3/0623; G06F 3/0652; G06F 3/0674; G06F 8/63; G06F 9/45558; G06F 2009/45562
USPC ............................................ 713/189; 726/26
See application file for complete search history.

(56) References Cited

U.S. PATENT DOCUMENTS

| | | | | |
|---|---|---|---|---|
| 7,865,536 | B1 * | 1/2011 | Ghemawat | G06F 16/1844 707/819 |
| 8,639,214 | B1 * | 1/2014 | Fujisaki | G06Q 20/306 455/406 |
| 8,682,867 | B2 | 3/2014 | Barton et al. | |
| 2006/0288044 | A1 * | 12/2006 | Kashiwagi | G11B 27/34 |
| 2008/0307414 | A1 * | 12/2008 | Alpern | G06F 9/45558 718/1 |
| 2009/0196417 | A1 | 8/2009 | Beaver et al. | |
| 2010/0008551 | A9 * | 1/2010 | Schiller | G06F 3/04886 382/187 |
| 2014/0201151 | A1 * | 7/2014 | Kumarasamy | G06F 16/168 707/646 |
| 2020/0264791 | A1 | 8/2020 | Sasson et al. | |
| 2022/0035556 | A1 | 2/2022 | Cashman et al. | |
| 2022/0147272 | A1 * | 5/2022 | Sasson | G06F 3/0659 |
| 2023/0297542 | A1 * | 9/2023 | Shinkle | G06F 16/1837 |
| 2023/0376455 | A1 * | 11/2023 | Subramanian | G06F 16/128 |
| 2023/0400955 | A1 * | 12/2023 | Barsky | G06F 3/04883 |
| 2024/0176770 | A1 * | 5/2024 | Parmar | G06F 16/16 |

(Continued)

OTHER PUBLICATIONS

NPL Search Terms (Year: 2025).*
NPL Search Terms (Year: 2026).*

*Primary Examiner* — Syed A Zaidi
(74) *Attorney, Agent, or Firm* — M&B IP Analysts, LLC

(57) ABSTRACT

A system and method for remediating exposed deleted client data in a cloud computing virtualization is presented. The method includes accessing a disk of a virtualization in a computing environment, the disk including deleted data; recovering at least a file from the deleted data; detecting client data on the at least a file, wherein the client data is untied to any functionality provided by the virtualization; and permanently deleting the detected client data from the disk.

19 Claims, 6 Drawing Sheets

(56) References Cited

U.S. PATENT DOCUMENTS

2025/0077256 A1 * 3/2025 Farley ................ G06F 9/45558
2025/0165349 A1 * 5/2025 Bhargava M.R. .. G06F 11/1469

* cited by examiner

TECHNIQUES FOR REMEDIATING DELETED DATA CYBERSECURITY RISKS

TECHNICAL FIELD

The present disclosure relates generally to cybersecurity vulnerability detection, and specifically to detecting vulnerabilities in deleted files.

BACKGROUND

A third-party base image is a pre-built software container image created and distributed by an entity other than the organization or individual deploying the application. These images serve as foundational layers for building other containers and typically include operating systems, runtimes, libraries, or language environments. Developers use them to avoid reinventing common system configurations, accelerate development, and ensure compatibility with existing software stacks. By inheriting a base image, a developer can focus on their application code rather than the underlying system dependencies.

These images are often provided by open source communities, commercial vendors, or independent maintainers on public registries like Docker Hub or GitHub Container Registry. Examples include Ubuntu, Python, Node.js, or database images, each packaged and maintained by different organizations or contributors. While many of these sources are reputable, the ecosystem remains open, allowing virtually anyone to publish an image that others can download and use.

Third-party base images pose a cybersecurity risk because they may contain unpatched vulnerabilities, backdoors, or malicious code embedded either intentionally or unintentionally. Since users typically trust that these images are safe and do not inspect every layer, a compromised or poorly maintained image can introduce security weaknesses into production environments. Additionally, the provenance and integrity of these images are often unclear, making it difficult to assess their authenticity or verify whether they have been tampered with during transit or storage. In high-assurance environments, this lack of transparency and control can become a significant vector for supply chain attacks, where adversaries exploit dependencies to gain unauthorized access or compromise systems indirectly.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include accessing a disk of a virtualization in a computing environment, the disk including deleted data. The method may also include recovering at least a file from the deleted data. The method may furthermore include detecting client data on the at least a file, where the client data is untied to any functionality provided by the virtualization. The method may in addition include permanently deleting the detected client data from the disk. Other embodiments of this aspect include corresponding computer systems, apparatus, and computer programs recorded on one or more computer storage devices, each configured to perform the actions of the methods.

Implementations may include one or more of the following features. The method where permanently deleting the detected client data further may include: detecting a storage block containing thereon at least a portion of the detected client data; and overwriting the detected storage block. The method may include: detecting in the at least a file data which is unutilized by the virtualization; and determining that the data is client data in response to determining that the data is unutilized. The method may include: generating a representation of the detected client data; generating a representation of the virtualization; and storing the generating representation of the detected client data and the representation of the virtualization in a security database, where the security database includes a representation of the computing environment. The method may include: detecting an encryption key associated with a storage block, the storage block including the client data; and deleting the encryption key prior to permanently deleting the detected client data from the disk. The method may include: shredding the at least a file. The method may include: detecting a software image based on which the virtualization is deployed; generating a new software image based on the virtualization after the client data is permanently deleted; and replacing the software image with the new software image. The method may include: detecting a code object based on which the virtualization is deployed; generating a new code object based on the virtualization after the client data is permanently deleted; and replacing the code object with the new code object. The method may include: instantiating a new virtualization based on the new code object. Implementations of the described techniques may include hardware, a method or process, or a computer tangible medium.

In one general aspect, a non-transitory computer-readable medium may include one or more instructions that, when executed by one or more processing circuitries of a device, cause the device to: access a disk of a virtualization in a computing environment, the disk including deleted data; recover at least a file from the deleted data; detect client data on the at least a file, where the client data is untied to any functionality provided by the virtualization; and permanently delete the detected client data from the disk. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: access a disk of a virtualization in a computing environment, the disk including deleted data. The system may in addition recover at least a file from the deleted data. The system may moreover detect client data on the at least a file, where the client data is untied to any functionality provided by the virtualization. The system may also permanently delete the detected client data from the disk. Other embodiments of this aspect include corresponding computer systems, apparatus, and computer programs recorded on one or more computer storage devices, each configured to perform the actions of the methods.

Implementations may include one or more of the following features. The system where the memory contains further instructions that, when executed by the processing circuitry for permanently deleting the detected client data, further configure the system to: detect a storage block containing thereon at least a portion of the detected client data; and overwrite the detected storage block. The system where the memory contains further instructions which when executed by the processing circuitry further configure the system to: detect in the at least a file data which is unutilized by the virtualization; and determine that the data is client data in response to determining that the data is unutilized. The system where the memory contains further instructions which when executed by the processing circuitry further configure the system to: generate a representation of the detected client data; generate a representation of the virtualization; and store the generating representation of the detected client data and the representation of the virtualization in a security database, where the security database includes a representation of the computing environment. The system where the memory contains further instructions which when executed by the processing circuitry further configure the system to: detect an encryption key associated with a storage block, the storage block including the client data; and delete the encryption key prior to permanently deleting the detected client data from the disk. The system where the memory contains further instructions which when executed by the processing circuitry further configure the system to: shred the at least a file. The system where the memory contains further instructions which when executed by the processing circuitry further configure the system to: detect a software image based on which the virtualization is deployed; generate a new software image based on the virtualization after the client data is permanently deleted; and replace the software image with the new software image. The system where the memory contains further instructions which when executed by the processing circuitry further configure the system to: detect a code object based on which the virtualization is deployed; generate a new code object based on the virtualization after the client data is permanently deleted; and replace the code object with the new code object. The system where the memory contains further instructions which when executed by the processing circuitry further configure the system to: instantiate a new virtualization based on the new code object. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
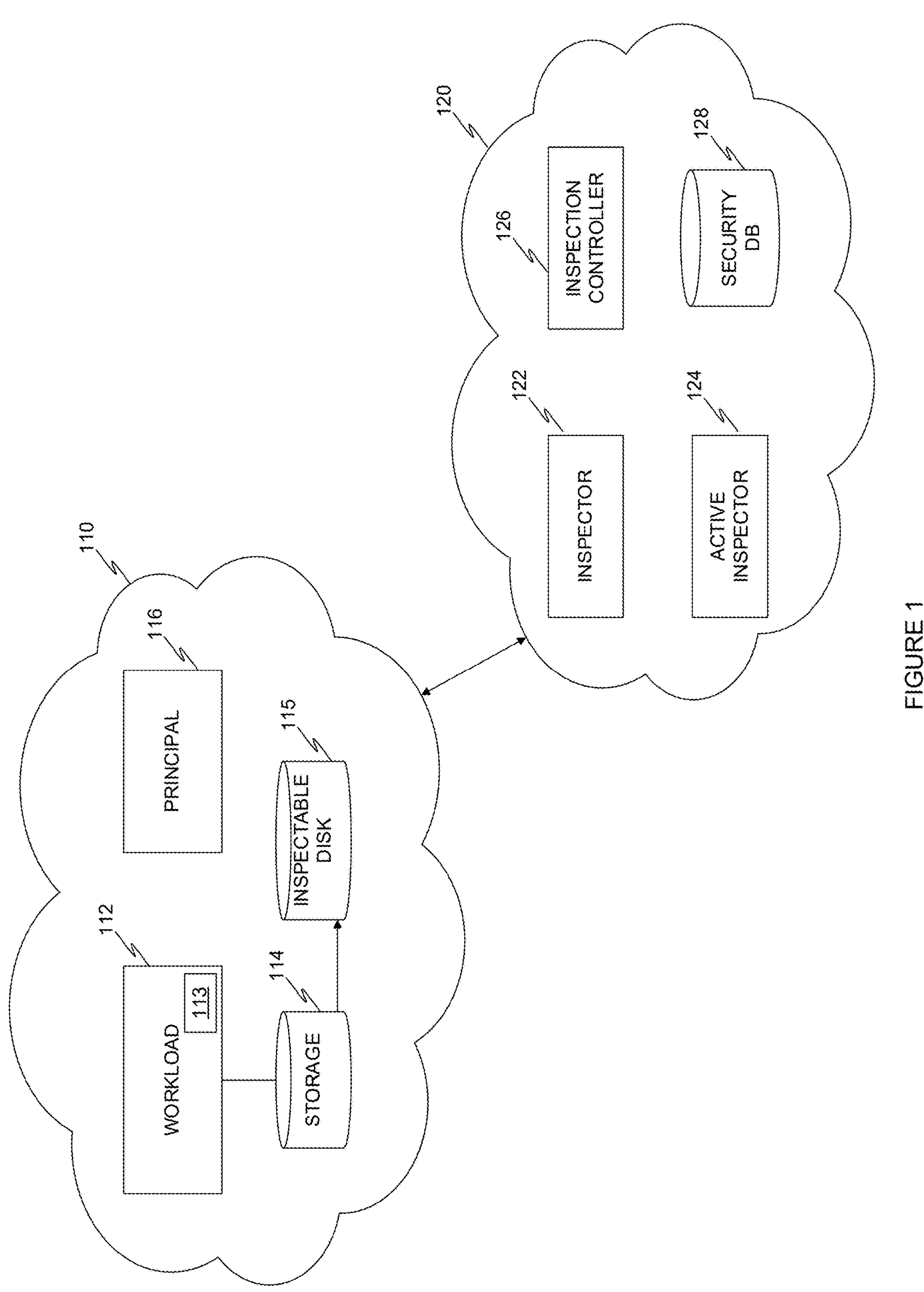
FIG. 1 is an example network diagram of a computing environment coupled with a cybersecurity inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram of a computing environment coupled with a cybersecurity inspection environment, utilized to describe an embodiment. In an embodiment, a computing environment 110 is a cloud computing environment, an on-prem environment, a hybrid environment, a networked computing environment, a combination thereof, and the like. In an embodiment, the computing environment 110 includes a virtual private cloud (VPC), a virtual network (VNet), a virtual private network (VPN), a combination thereof, and the like.

In some embodiments, the computing environment 110 is implemented as a cloud computing environment on a cloud computing infrastructure, such as Amazon® Web Service (AWS), Google® Cloud Platform (GCP), Microsoft® Azure, a combination thereof, and the like. In an embodiment, the computing environment 110 includes a plurality of resources, such as workload 112, and a plurality of principals, such as principal 116.

In an embodiment, a resource is an entity which provides a service, exposes a service, a combination thereof, and the like. A resource is, for example, implemented utilizing a virtual machine, a software container, a serverless function, a combination thereof, and the like. According to an embodiment, a principal is an entity, such as a user account, a service account, a role, a combination thereof, and the like.

In certain embodiments, a workload 112 is a virtual machine, a software container, a serverless function, a managed workload (e.g., managed database), an appliance, various combinations thereof, and the like. In an embodiment, the workload 112 includes a sensor application 113. For example, a sensor application 113 is configured to detect runtime events which include access to a storage 114 which is associated with the workload 112.

In some embodiments, the storage 114 is implemented as a disk, a volume, an OS disk, a data disk, various combinations thereof, and the like. In an embodiment, a storage 114 is implemented as a cloud computing storage.

In an embodiment, cloud storage distributes data across a network of remote servers managed by a cloud service provider (CSP), such as AWS. When a file is uploaded, for example, it is broken into data chunks, optionally encrypted, and stored redundantly across multiple physical locations to ensure durability and availability.

In some embodiments, metadata about the file, such as ownership, permissions, timestamps, and location mappings, is maintained in a distributed database. Object storage systems, such as Amazon® S3, Google® Cloud Storage, and the like, treat files as immutable objects referenced by unique keys. As another example, block storage and file storage systems simulate traditional disk behavior, however in practice these solutions are abstracted over a networked infrastructure.

When a file is accessed, the cloud storage system retrieves its metadata to locate and reassemble the correct chunks. In an embodiment, the CSP storage may be cached, optimized with erasure coding, optimized with compression, and the like, to reduce storage overhead and improve performance. According to an embodiment, a client of the CSP interfaces with the cloud storage using APIs, protocols, and the like, and access control is enforced through identity management systems.

When a file is deleted in cloud storage, the deletion is typically logical, not physical. For example, in some embodiments, metadata marking the object, file, etc., as accessible is removed, flagged as deleted, and the like. The file becomes immediately unavailable to principals of the environment.

In practice, the actual data may still reside on a disk for some time, depending on the CSP's garbage collection and retention policies. This delay allows features like versioning, undelete, and audit logging. Eventually, a background process will purge the underlying data blocks, overwrite them, etc., thus releasing the space for reuse. In some systems, where versioning is enabled, deleting a file only creates a delete marker, and older versions still persist until explicitly removed. Moreover, due to the distributed nature of storage, the final deletion may involve coordination across multiple nodes and replicas, ensuring consistency and integrity.

Such deletion procedures present a cybersecurity risk. For example, a provider may assume that data, such as a secret, is deleted, however the data itself persists and may be accessible.

In an embodiment, the computing environment 110 is inspected by an inspection environment 120 for cybersecurity monitoring. In some embodiments, the inspection environment is a cloud computing environment. In certain embodiments, some components, elements, and the like, of the inspection environment 120 are implemented in the computing environment 110.

In some embodiments, the inspection environment includes an inspector 122, an active inspector 124, an inspection controller 126, and a security database 128. In an embodiment, an inspector 122 is configured to inspect for cybersecurity objects. In some embodiments, a cybersecurity object is a file, a folder, a filesystem, an object, an application, a binary, a library, a code object, a secret, a key, a certificate, a combination thereof, and the like.

In certain embodiments, an active inspector 124 is configured to actively inspect network paths to a resource, for example from a network path which includes an external network, a public network, and the like, which are not part of the computing environment 110. For example, in an embodiment, the active inspector 124 receives a network path and attempts to access a resource of the computing environment 110 through the network path from an external network.

An inspection controller 126 is configured, in some embodiments, to initiate inspection of the computing environment 110. In some embodiments, the inspection controller 126 is configured to provision inspector workloads, such as inspector 122 and active inspector 124, configured to determine an order of inspection, a frequency of inspection, and the like.

In an embodiment, inspection includes detecting a storage 114 and generating therefrom an inspectable disk 115. In some embodiments, the inspectable disk 115 is inspected by the inspector 122 for a cybersecurity object, a combination of cybersecurity objects, and the like. In an embodiment, an inspectable disk is a copy generated based on the storage 114, a snapshot generated based on the storage 114 (from which the inspectable disk 115 is then generated), a clone of the storage 114, and the like.

In an embodiment, an inspector 122 is configured to detect a cybersecurity object only on deleted files, deleted objects, and the like, on a combination of available and deleted objects, etc.

In certain embodiments, the inspector 122 is configured to detect a deleted file on the inspectable disk 115, on the storage 114, etc. As an example, the computing environment 110 is implemented as a cloud computing environment on AWS.

In AWS, detecting deleted files is inherently tied to the type of storage service being used and the level at which observability is implemented. For object storage like Amazon S3, deletions occur via API calls such as DeleteObject or DeleteObjects, which are captured by AWS CloudTrail®. CloudTrail maintains an event log of API activity across AWS services, recording metadata such as the identity of the user account, service account, etc., that initiated the request, the time of the operation, the IP address used, the specific bucket affected, the object affected, a combination thereof, and the like. These logs can be queried, for example, by the inspector 122 for detection of deletions.

Where S3 versioning is enabled, object deletion does not physically remove data. A delete marker, tag, and the like is appended to the object, which allows a client to interpret the object as deleted while retaining older versions. By listing object versions via the ListObjectVersions API, the presence of a delete marker is detectable and data is therefore detectable.

For block-level storage such as elastic block storage (EBS) and file-level storage like elastic file storage (EFS), AWS does not provide native visibility into file-level operations. According to an embodiment, detection in block-level storage context requires instrumentation at the operating system level. For example, on EC2 instances using EBS volumes, a sensor 113 is configured to monitor filesystem events, including deletions. In an embodiment, such events are sent to the inspection controller 126.

In an embodiment, an inspector 122 is configured to scan an inspectable disk 115 at a block level to locate a deleted file. In some embodiments, the inspector 122 is configured to reconstruct a deleted file content. For example, in an embodiment, the inspector 122 is configured to scan a block of storage for a recognizable file signature, recoverable metadata indicating the presence of a file, a combination thereof, and the like. In an embodiment, a recovered file is inspected for a cybersecurity object. In some embodiments, the active inspector 124, the inspector 122, the inspection controller 126, a combination thereof, and the like, is configured to store a detection, a representation, and the like, on a security database 128.

In an embodiment, the security database 128 is implemented as a tabular database, a columnar database, a graph database, a combination thereof, and the like. In some embodiments, the security database 128 includes a representation of the computing environment 110. In an embodiment, a representation of a computing environment 110 includes a representation of resources, principals, enrichments, endpoints, cybersecurity risks, remediation actions, mitigation actions, policies, controls, various combinations thereof, and the like.

For example, in an embodiment, the security database 128 is implemented as a graph database (e.g., Node4j®) which includes a unified data schema. In an embodiment, a unified data schema is utilized to represent entities of a computing environment across multiple computing environment, multiple CSPs, etc. For example, a virtual machine from AWS is represented using the same schema as a virtual machine on GCP. As another example, user accounts, service accounts, principals, and the like, are all represented using a principal-type schema of the unified schema.

In an embodiment, a detection from the inspector 122 is stored in the security database 128. For example, where the inspector 122 detects a cybersecurity object such as a cryptographic key on a deleted file in the inspectable disk 115, a representation of the storage 114, a representation of the workload 112, and a representation of the cryptographic key are each generated in the security database 128. In some embodiments, the representations are connected together (for example by an edge in a graph), wherein the connection further indicates a relationship between the represented entities.

Figure 2:
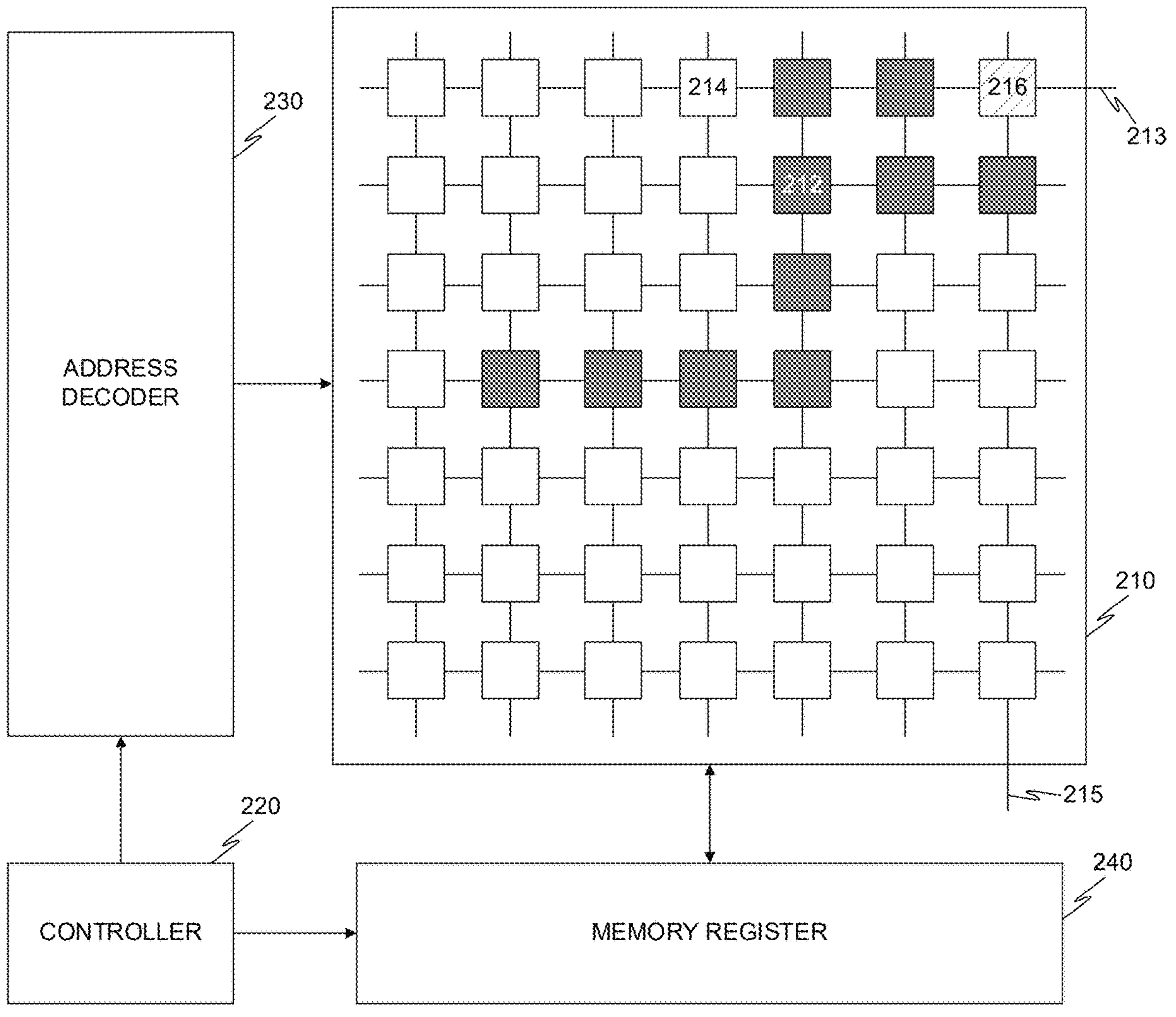
FIG. 2 is an example schematic illustration of a memory array, utilized to describe an embodiment.

FIG. 2 is an example schematic illustration of a memory array, utilized to describe an embodiment. In an embodiment, storage, and especially cloud storage, is often more complex but relies on similar mechanisms which are thus worth reciting here.

In digital storage systems, and particularly in storage systems involving solid-state drives (SSDs), hard drives, memory-based storage, and combinations thereof, data is written to, and deleted from, physical media, logical media, etc., using a coordinated process involving an address decoder 230, a controller circuit 220, a block storage 210, and memory registers 240.

In an embodiment, the controller circuit 220 is configured to receive a command from a host system (e.g., CPU or OS), for example when a write operation is initiated. The controller circuit 220 interprets the logical block address (LBA) provided by the host and maps it to a physical location in the storage medium. This mapping is managed through firmware and translation layers such as the Flash Translation Layer (FTL) in SSDs or sector mapping tables in HDDs.

Once the destination is determined by the control circuit 220, the address decoder 230 translates a high-level address signal into specific control signals that activate rows or blocks in the physical storage array 210, such as a first address line 213 and a second address line 215. For example, in NAND flash, the address decoder 230 decodes the block and page numbers into voltage signals that enable the corresponding word lines (e.g., address line 213) and bit lines (e.g., address line 215) on the memory array.

In an embodiment, the memory register 240 is a temporary data buffer between the storage media (storage 210) and an external bus. The memory register 240 is configured to load the incoming data and hold it while the control circuit 220 verifies timing, error correction codes (ECC), and proper voltage levels. After validation, the data is physically written to the target cells or sectors in the block storage medium, which is organized in fixed-size units (e.g., pages, blocks, sectors).

For deletion, the controller 220 is configured to update its mapping tables to mark specific blocks or sectors as invalid or free. In NAND flash, data is not immediately erased; instead, the block is flagged for erasure in a future garbage collection cycle. The address decoder may later re-enable those blocks when the controller initiates a block erase, and the erased space is made available for future writes.

In an embodiment, certain data is marked by the control circuit 220 as empty (e.g., bit 214), full (e.g., bit 212), or marked for deletion (e.g., bit 216). In this manner, as long as data is marked for deletion but garbage collection has not occurred, the data stored on bit 216 can still be read therefrom.

Figure 3:
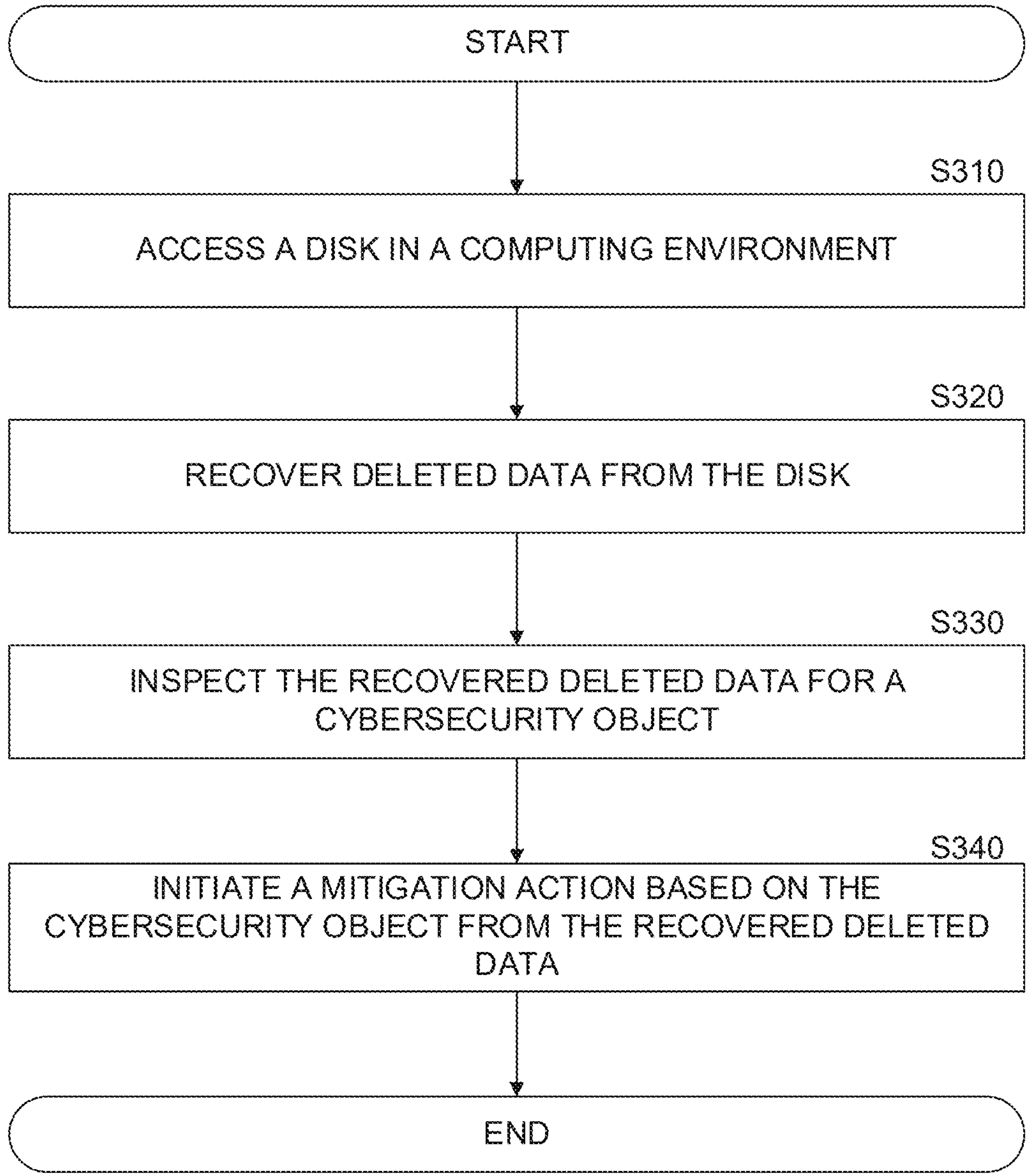
FIG. 3 is an example flowchart of a method for inspecting deleted data for cybersecurity risks, implemented in accordance with an embodiment.

FIG. 3 is an example flowchart of a method for inspecting deleted data for cybersecurity risks, implemented in accordance with an embodiment.

At S310, a disk is accessed in a computing environment. In an embodiment, the disk is an inspectable disk, generated based on an original disk. In some embodiments, the inspectable disk is generated based only on block storage, which is identified as including deleted files, deleted objects, etc.

In some embodiments, accessing a disk includes generating an inspectable disk utilizing copying, cloning, snapshot generation (and subsequently mounting a volume based on the snapshot), a combination thereof, and the like.

In an embodiment, accessing a disk includes configuring an inspector of an inspection environment to have access, including permissions, privileges, etc., which allows the inspector to access the disk.

In some embodiments, the computing environment is a cloud computing environment, a registry of software images, a code repository, a version control system, various combinations thereof, and the like. In certain embodiments, the disk is a virtual disk.

At S320, deleted data is recovered. In an embodiment, recovering deleted data includes determining how a file is deleted in the computing environment. For example, recovering data from a block storage device after deletion depends on how the deletion was handled at both the file system level and the physical storage level. In block storage, such as used in SSDs, HDDs, or cloud block volumes (like Amazon EBS), data is stored in fixed-size blocks, and the system manages access based on logical addresses rather than file names or structures.

When a file is deleted, the operating system typically updates the file system's metadata to mark the associated blocks as "free" or "unallocated." Crucially, the actual contents of those blocks are not immediately overwritten. As the data remains physically on the device until it is explicitly overwritten by new writes or erased through a maintenance operation like garbage collection, data recovery is often possible.

According to an embodiment, data recovery includes scanning the block storage medium (e.g., the inspectable disk) at a low level, bypassing the file system. In an embodiment, raw block contents are analyzed, for example by an inspector, to identify recognizable patterns, such as file headers, consistent byte structures, and the like, that signal the start and end of a known file type. In an embodiment, deleted files are reconstructed, for example by an inspector, which is configured to assemble these blocks into coherent data segments.

In certain embodiments, for example where the storage is on a managed system with snapshots, journaling, and the like, (e.g., LVM snapshots or cloud-based EBS snapshots), recovery includes mounting an earlier point-in-time image, which preserves the state of blocks before deletion occurred.

At S330, the recovered data is inspected for a cybersecurity object. In an embodiment, a cybersecurity object indicates a cybersecurity threat. In some embodiments, a plurality of cybersecurity objects together indicate a cybersecurity threat; this is also referred to as a toxic combination. In certain embodiments, detecting a cybersecurity object as a deleted file allows to determine a toxic combination based on a cybersecurity object which is present on the disk (e.g., is not a deleted file) and another cybersecurity object which is detected in the deleted file.

In some embodiments, software images, such as base images, store deleted files thereon. Such deleted files are often left unintentionally, for example as part of the build process. It is advantageous to clean such software images from these cybersecurity objects, as these pose a cybersecurity risk should an attacker access them.

In an embodiment, a cybersecurity object is a file, a folder, an application, a binary, a library, a code object, a secret, a certificate, a cryptographic key, a password, a passphrase, a token, a credential, a combination thereof, and the like.

At S340, a mitigation action is initiated. In an embodiment, the mitigation action includes deleting the cybersecurity object permanently from the storage, for example by initiating the garbage collection mechanism.

In some embodiments, the mitigation action includes generating a new software image, based on a virtual instance associated with a disk where the cybersecurity object has been permanently deleted. For example, this is achieved by instantiating a virtualization based on the software image, permanently deleting the cybersecurity object from the virtualization, then generating a new software image based on the instantiated virtualization.

In certain embodiments, a software image for which a deleted cybersecurity object is detected thereon (e.g., the cybersecurity object is detected on a disk associated with a virtualization instantiated based on the software image), is barred from deployment in the cloud computing environment.

Figure 4:
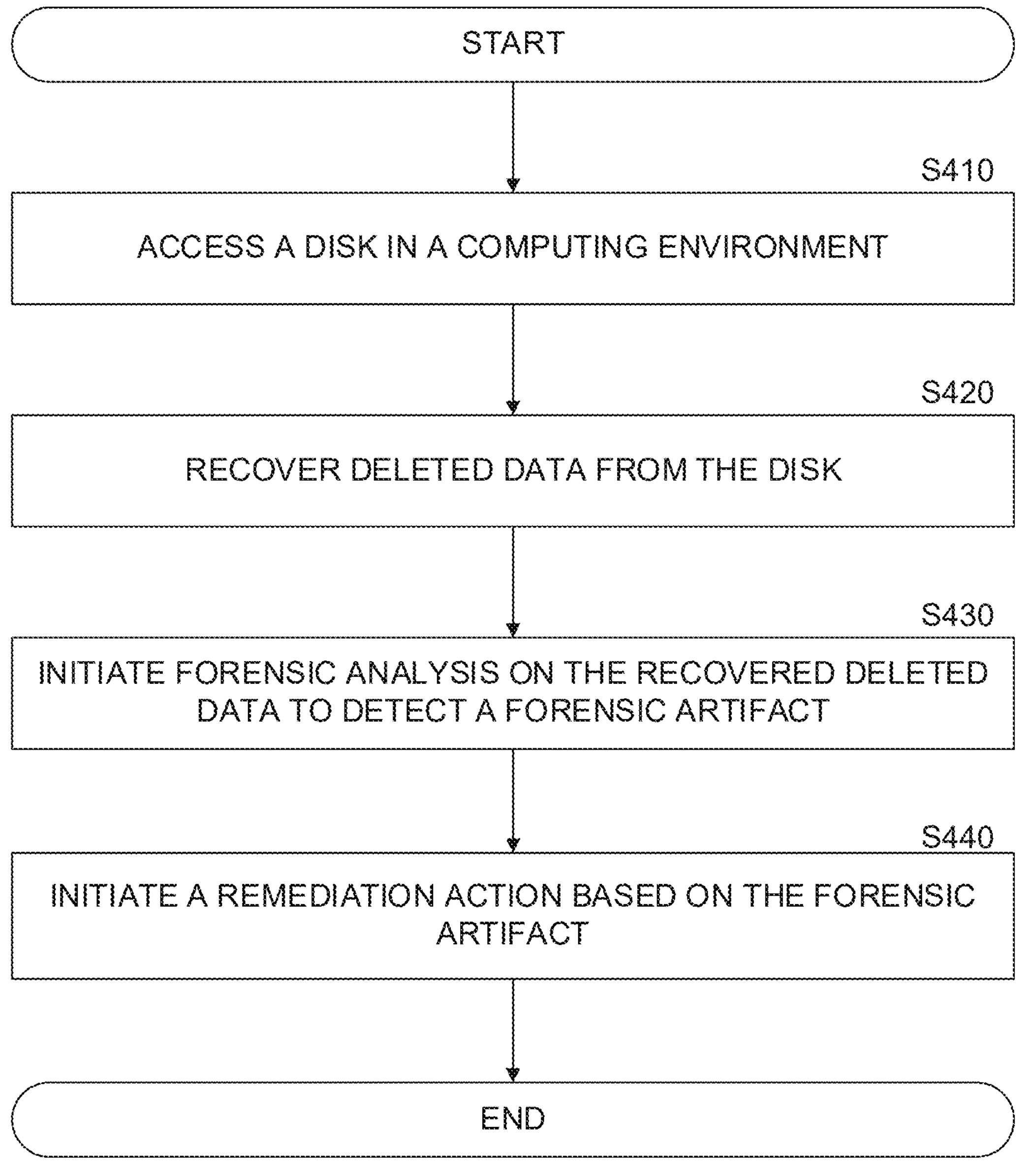
FIG. 4 is an example flowchart of a method for forensic analysis based on deleted data files, implemented according to an embodiment.

FIG. 4 is an example flowchart of a method for forensic analysis based on deleted data files, implemented according to an embodiment.

At S410, a disk is accessed in a computing environment. In an embodiment, the disk is an inspectable disk, generated based on an original disk. In some embodiments, the inspectable disk is generated based only on block storage which is identified as including deleted files, deleted objects, etc. In an embodiment, the accessed disk is associated with a machine which is suspected of being attacked, has indicators of attack, and the like.

In some embodiments, accessing a disk includes generating an inspectable disk utilizing copying, cloning, snapshot generation (and subsequently mounting a volume based on the snapshot), a combination thereof, and the like.

In an embodiment, accessing a disk includes configuring an inspector of an inspection environment to have access, including permissions, privileges, etc., which allows the inspector to access the disk.

In some embodiments, the computing environment is a cloud computing environment, a registry of software images, a code repository, a version control system, various combinations thereof, and the like. In certain embodiments, the disk is a virtual disk.

At S420, deleted data is recovered. In an embodiment, recovering deleted data includes determining how a file is deleted in the computing environment. For example, recovering data from a block storage device after deletion depends on how the deletion was handled at both the file system level and the physical storage level. In block storage, such as used in SSDs, HDDs, or cloud block volumes (like Amazon EBS), data is stored in fixed-size blocks, and the system manages access based on logical addresses rather than file names or structures.

When a file is deleted, the operating system typically updates the file system's metadata to mark the associated blocks as "free" or "unallocated." Crucially, the actual contents of those blocks are not immediately overwritten. As the data remains physically on the device until it is explicitly overwritten by new writes or erased through a maintenance operation like garbage collection, data recovery is often possible.

According to an embodiment, data recovery includes scanning the block storage medium (e.g., the inspectable disk) at a low level, bypassing the file system. In an embodiment, raw block contents are analyzed, for example by an inspector, to identify recognizable patterns, such as file headers, consistent byte structures, and the like, that signal the start and end of a known file type. In an embodiment, deleted files are reconstructed, for example by an inspector, which is configured to assemble these blocks into coherent data segments.

In certain embodiments, for example where the storage is on a managed system with snapshots, journaling, and the like, (e.g., LVM snapshots or cloud-based EBS snapshots), recovery includes mounting an earlier point-in-time image, which preserves the state of blocks before deletion occurred.

At S430, forensic analysis is initiated. In an embodiment, forensic analysis is initiated on the recovered deleted data. In some embodiments, forensic analysis includes detecting a forensic artifact. In an embodiment, a forensic artifact indicates an event, an action, a state, and the like, of the virtualization associated with the disk.

In an embodiment, an artifact includes a failed login attempt, an event record, a registry key, a code object, a file, a folder, and the like, which indicate that an attack took place on the machine, or that the machine was otherwise accessed in a manner which was not intended.

According to an embodiment, an inspector is configured to initiated forensic analysis on the disk. In an embodiment, a forensic artifact is distinct from a cybersecurity object. While a cybersecurity object indicates a cybersecurity issue, such as a potential cybersecurity issue, a forensic artifact is a digital record of an actual cybersecurity attack which took place on the virtualization, using the virtualization, etc. Where an attacker attempts to mask their presence by deleting files, deleting logs, and the like, recovering such data allows to detect what actions an attacker initiated, for example.

At S440, a remediation action is initiated. In an embodiment, the remediation action is initiated based on the forensic artifact. In some embodiment, the forensic artifact indicates a forensic finding, i.e., a determination that a cybersecurity attack occurred involving the virtualization.

In an embodiment, a remediation action includes revoking access from a principal, revoking access from a resource, revoking access to a resource, sandboxing the virtualization, configuring a firewall to block network traffic to the computing environment, configuring a firewall to block network traffic from the computing environment to a specific IP address, range of IP addresses, various combinations thereof, and the like.

In some embodiments, a remediation action includes initiating inspection for additional cybersecurity objects, of additional resources, and the like. For example, in an embodiment where a forensic artifact is detected on a software container deploying an NGINX® load balancer, web servers connected to the load balancer are inspected for cybersecurity objects which indicate an attack based on the forensic artifact.

Figure 5:
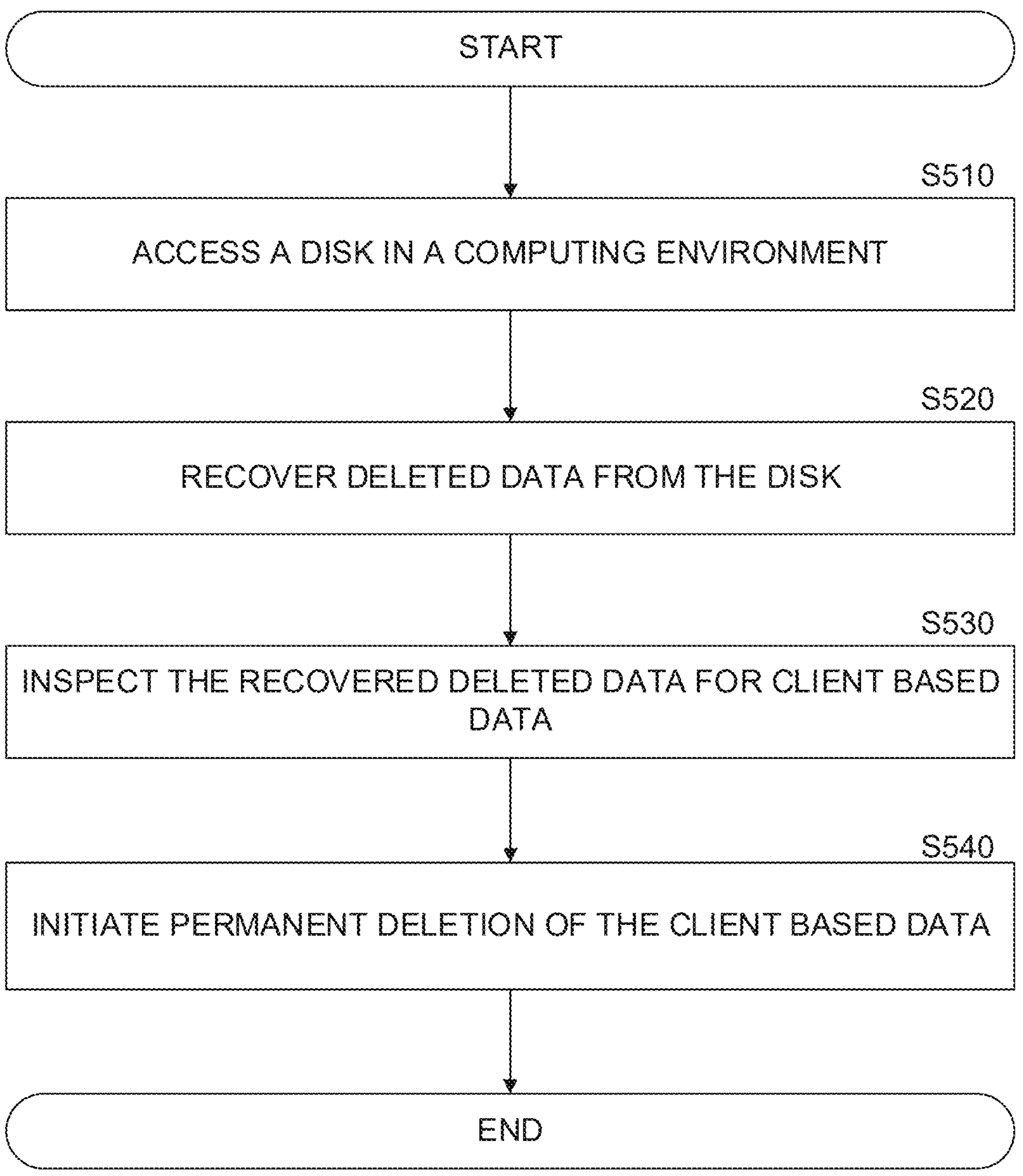
FIG. 5 is an example flowchart of a method for securing deleted data in a computing environment, implemented according to an embodiment.

FIG. 5 is an example flowchart of a method for securing deleted data in a computing environment, implemented according to an embodiment.

At S510, a disk is accessed in a computing environment. In an embodiment, the disk is an inspectable disk, generated based on an original disk. In some embodiments, the inspectable disk is generated based only on block storage which is identified as including deleted files, deleted objects, etc.

In some embodiments, accessing a disk includes generating an inspectable disk utilizing copying, cloning, snapshot generation (and subsequently mounting a volume based on the snapshot), a combination thereof, and the like.

In an embodiment, accessing a disk includes configuring an inspector of an inspection environment to have access, including permissions, privileges, etc., which allows the inspector to access the disk.

In some embodiments, the computing environment is a cloud computing environment, a registry of software images, a code repository, a version control system, various combinations thereof, and the like. In certain embodiments, the disk is a virtual disk.

At S520, deleted data is recovered. In an embodiment, recovering deleted data includes determining how a file is deleted in the computing environment. For example, recovering data from a block storage device after deletion depends on how the deletion was handled at both the file system level and the physical storage level. In block storage, such as used in SSDs, HDDs, or cloud block volumes (like Amazon EBS), data is stored in fixed-size blocks, and the system manages access based on logical addresses rather than file names or structures.

When a file is deleted, the operating system typically updates the file system's metadata to mark the associated blocks as "free" or "unallocated." Crucially, the actual contents of those blocks are not immediately overwritten. As the data remains physically on the device until it is explicitly overwritten by new writes or erased through a maintenance operation like garbage collection, data recovery is often possible.

According to an embodiment, data recovery includes scanning the block storage medium (e.g., the inspectable disk) at a low level, bypassing the file system. In an embodiment, raw block contents are analyzed, for example by an inspector, to identify recognizable patterns, such as file headers, consistent byte structures, and the like, that signal the start and end of a known file type. In an embodiment, deleted files are reconstructed, for example by an inspector, which is configured to assemble these blocks into coherent data segments.

In certain embodiments, for example where the storage is on a managed system with snapshots, journaling, and the like, (e.g., LVM snapshots or cloud-based EBS snapshots), recovery includes mounting an earlier point-in-time image, which preserves the state of blocks before deletion occurred.

At S530, the deleted data is inspected for client data. In an embodiment, client data is data which is associated with a specific client, such as the tenant of the cloud service provider on which the virtualization associated with the disk is deployed.

In an embodiment, client data includes secrets, passwords, API keys, encryption keys, tokens, cookies, a combination thereof, and the like. According to an embodiment, client data includes data which is placed by the client on the storage which the client does not intend to remain on the storage.

In an embodiment, a detection is generated. In some embodiments, a detection is a data record which indicates that client data is detected on the disk. In certain embodiments, the client data is stored on a security database. In some embodiments, metadata of the client data, and not the data itself, is stored on the security database.

This allows, for example, to indicate that this data was detected and where it was detected, without further exposure risk for the client data. In an embodiment, a detection is generated regardless of any mitigation, remediation, and the like actions which are initiated in the computing environment.

At S540, permanent deletion of client data is initiated. In an embodiment, deleting data from a disk includes initiating a garbage collection on the disk. According to an embodiment, where a file is deleted in a cloud block storage system (e.g., AWS EBS, Azure Managed Disks, Google Persistent Disks, and the like), the cloud provider first removes the logical references to the data. This deallocates the blocks and marks them as available for reuse, but the actual data may still reside physically on the backend storage.

In an embodiment, permanent deletion includes deleting the encryption key associated with a block, which renders the data unreadable, even if the physical blocks are intact. Without the key, the encrypted data cannot be decrypted and is effectively lost, achieving the effect of permanent deletion almost instantly.

In some embodiments, zeroing (or shredding) is initiated on the file, which involves overwriting the physical blocks with zeros, random data, etc. In an embodiment, a new software image, based on a virtual instance associated with a disk where the client data is detected, is generated. In an embodiment, the new software image is based on a storage state where the client data has been permanently deleted. For example, this is achieved by instantiating a virtualization based on the software image, permanently deleting the client data from a disk associated with the virtualization, then generating a new software image based on the instantiated virtualization after permanent deletion.

Figure 6:
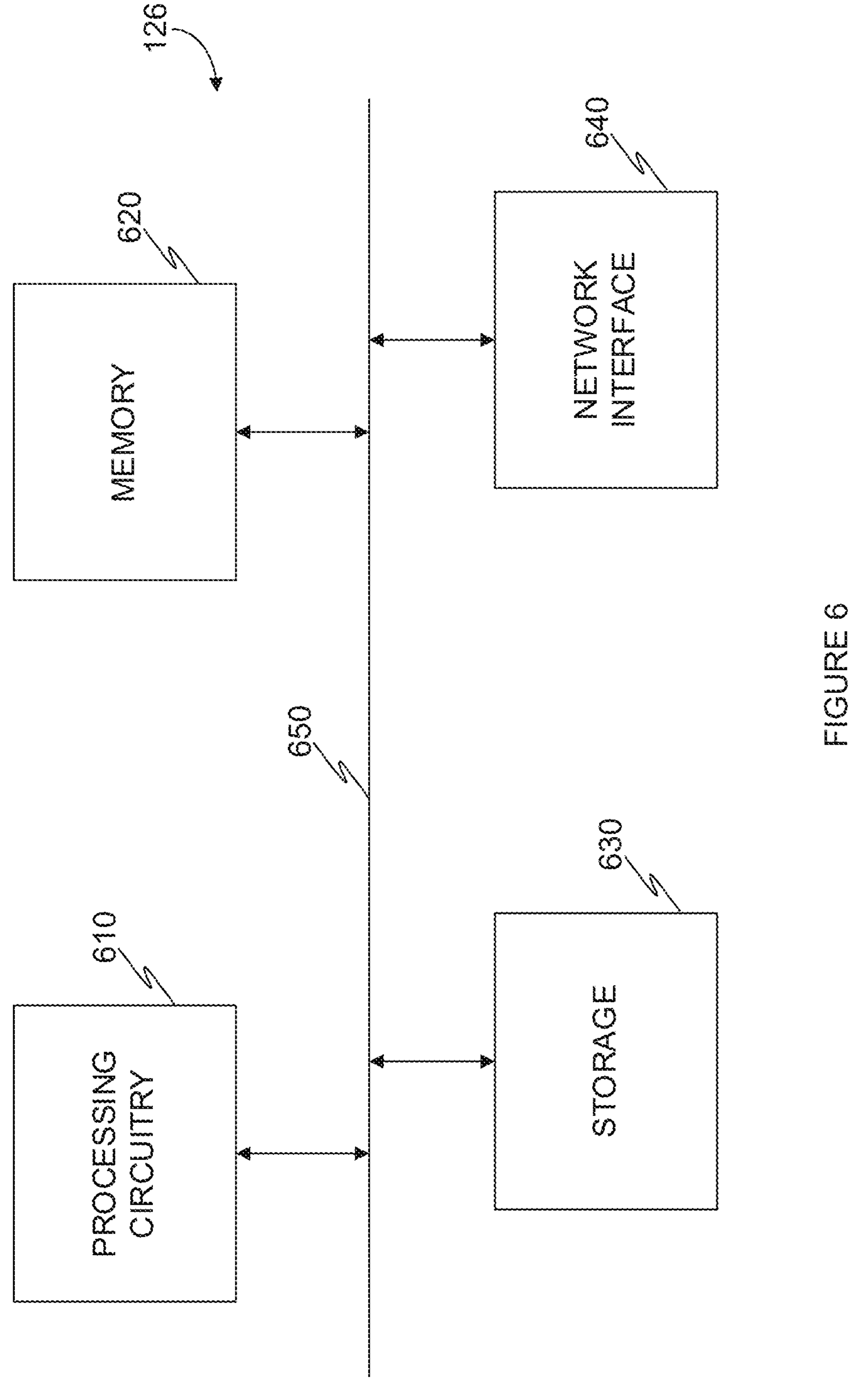
FIG. 6 is an example schematic diagram of an inspection controller according to an embodiment.

FIG. 6 is an example schematic diagram of an inspection controller 126 according to an embodiment. The inspection controller 126 includes, according to an embodiment, a processing circuitry 610 coupled to a memory 620, a storage 630, and a network interface 640. In an embodiment, the components of the inspection controller 126 are communicatively connected via a bus 650.

In certain embodiments, the processing circuitry 610 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 620 is a volatile memory (e.g., random access memory, etc.), a non-volatile memory (e.g., read only memory, flash memory, etc.), a combination thereof, and the like. In some embodiments, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein is stored in the storage 630, in the memory 620, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 610, cause the processing circuitry 610 to perform the various processes described herein, in accordance with an embodiment.

In some embodiments, the storage 630 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 640 is configured to provide the inspection controller 126 with communication with, for example, the computing environment 110, the inspection environment 120, and the like, according to an embodiment.

It should be understood that the embodiments described herein are not limited to the specific architecture illustrated in FIG. 6, and other architectures may be equally used without departing from the scope of the disclosed embodiments.

Furthermore, in certain embodiments the inspector 122, active inspector 124, security database 128, inspection controller 126, a combination thereof, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for remediating exposed deleted client data in a cloud computing virtualization, comprising:

accessing a disk of a virtualization in a computing environment, the disk including deleted data, wherein the deleted data is one or more blocks;

analyzing the one or more blocks at a low level, wherein the low level bypasses a file system;

reconstructing a file based on the analyzed one or more blocks;

detecting data in the file unutilized by the virtualization;

determining the data is client data in response to the detected data is unutilized; and permanently deleting the client data from the disk.

2. The method of claim 1, wherein permanently deleting the client data further comprises:

detecting a storage block among the one or more blocks containing thereon at least a portion of the client data; and overwriting the detected storage block.

3. The method of claim 1, further comprising:

generating a representation of the client data;

generating a representation of the virtualization; and storing the representation of the client data and the representation of the virtualization in a security database, wherein the security database includes a representation of the computing environment.

4. The method of claim 1, further comprising:

detecting a storage block among the one or more blocks containing thereon at least a portion of the detected client data;

detecting an encryption key associated with the storage block; and deleting the encryption key prior to permanently deleting the client data from the disk.

5. The method of claim 1, further comprising:

shredding the file.

6. The method of claim 1, further comprising:

detecting a software image based on which the virtualization is deployed;

generating a new software image based on the virtualization after the client data is permanently deleted; and replacing the software image with the new software image.

7. The method of claim 1, further comprising:

detecting a code object based on which the virtualization is deployed;

generating a new code object based on the virtualization after the client data is permanently deleted; and replacing the code object with the new code object.

8. The method of claim 7, further comprising:

instantiating a new virtualization based on the new code object.

9. The method of claim 1, further comprising:

identifying a file header in the analyzed one or more blocks, wherein reconstructing the file is further based on the identified file header.

10. The method of claim 1, further comprising:

identifying, on the disk, block storage including deleted files; and generating an inspectable disk based only on the identified block storage.

11. A non-transitory computer-readable medium storing a set of instructions for remediating exposed deleted client data in a cloud computing virtualization, the set of instructions comprising:

one or more instructions that, when executed by one or more processing circuitries of a device, cause the device to:

access a disk of a virtualization in a computing environment, the disk including deleted data, wherein the deleted data is one or more blocks;

analyze the one or more blocks at a low level, wherein the low level bypasses a file system;

reconstruct a file based on the analyzed one or more blocks;

detect data in the file unutilized by the virtualization;

determine the data is client data in response to the detected data is unutilized; and permanently delete the client data from the disk.

12. A system for remediating exposed deleted client data in a cloud computing virtualization comprising:

a processing circuitry;

a memory, the memory containing instructions that, when executed by the processing circuitry, configure the system to:

access a disk of a virtualization in a computing environment, the disk including deleted data, wherein the deleted data is one or more blocks;

analyze the one or more blocks at a low level, wherein the low level bypasses a file system;

reconstruct a file based on the analyzed one or more blocks;

detect data in the file unutilized by the virtualization;

determine the data is client data in response to the detected data is unutilized; and permanently delete the client data from the disk.

13. The system of claim 12, wherein the memory contains further instructions that, when executed by the processing circuitry for permanently deleting the client data, further configure the system to:

detect a storage block among the one or more blocks containing thereon at least a portion of the client data; and overwrite the detected storage block.

14. The system of claim 11, wherein the memory contains further instructions which when executed by the processing circuitry further configure the system to:

generate a representation of the client data;

generate a representation of the virtualization; and store the representation of the client data and the representation of the virtualization in a security database, wherein the security database includes a representation of the computing environment.

15. The system of claim 11, wherein the memory contains further instructions which when executed by the processing circuitry further configure the system to:

detect a storage block among the one or more blocks containing thereon at least a portion of the detected client data;

detect an encryption key associated with the storage block; and delete the encryption key prior to permanently deleting the client data from the disk.

16. The system of claim 11, wherein the memory contains further instructions which when executed by the processing circuitry further configure the system to:

shred the file.

17. The system of claim 12, wherein the memory contains further instructions which when executed by the processing circuitry further configure the system to:

detect a software image based on which the virtualization is deployed;

generate a new software image based on the virtualization after the client data is permanently deleted; and replace the software image with the new software image.

18. The system of claim 11, wherein the memory contains further instructions which when executed by the processing circuitry further configure the system to:

detect a code object based on which the virtualization is deployed;

generate a new code object based on the virtualization after the client data is permanently deleted; and replace the code object with the new code object.

19. The system of claim 18, wherein the memory contains further instructions which when executed by the processing circuitry further configure the system to:

instantiate a new virtualization based on the new code object.

* * * * *